United States Patent Office 3,732,284
Patented May 8, 1973

3,732,284
PROCESS FOR THE PREPARATION OF β-CYCLOALKYLPROPIONIC ESTERS OF DIMETHYLAMINOETHANOL
Raymond Valette, Saulxier par Saulx-les-Chartreux, France, assignor to Les Laboratoires Albert Rolland, Paris, France
No Drawing. Filed Aug. 12, 1969, Ser. No. 849,509
Claims priority application Great Britain, Aug. 20, 1968, 39,875/68
Int. Cl. C07c *93/22, 67/02*
U.S. Cl. 260—468 R          7 Claims

ABSTRACT OF THE DISCLOSURE

Therapeutically useful dimethylaminopropanol β-cycloalkylpropionate esters are prepared by reacting a methyl, ethyl, propyl or butyl cycloalkylpropionate ester with dimethylaminoethanol in a non-aqueous solvent.

---

The invention provides a process for the preparation of β-cycloalkylpropionic esters of dimethylaminoethanol, of the formula:

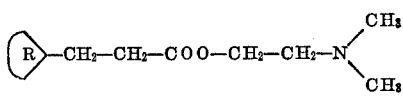

wherein the cyclic radical R represents a cycloalkyl group such as for example cyclopropyl, cyclobutyl, cyclopentyl, cyclohexyl or cycloheptyl. These esters are known substances possessing pharmaceutical properties. They have hitherto been prepared by reaction of cycloalkylpropionic acid chlorides with dimethylaminoethanol in a solvent.

It has now been found that it is possible to prepare these same esters in good yields and in an advantageous manner by a transesterification reaction, that is to say by reacting an alkyl β-cycloalkylpropionate directly with dimethylaminoethanol in the presence of sodium ethoxide or sodium methoxide. This method makes it possible to obtain the ester of the aminoalcohol directly in the reaction medium as a base, which can be easily distilled, to obtain a pure ester, or directly converted into an appropriate inorganic or organic salt.

The starting material for carrying out this reaction is a methyl, ethyl, propyl or butyl cycloalkylpropionate ester which is reacted with dimethylaminoethanol in the presence of a suitable solvent. This solvent may be either a hydrocarbon such as toluene or xylene or an excess of dimethylaminoethanol.

In the first case (where the solvent is toluene or xylene) the product is repeatedly washed with water until neutral to phenolphthalein, thoroughly dried, and then distilled under ordinary pressure. Once the solvent has been driven off, the distillation is carried out under reduced pressure and the desired bases distil at about 100° C. They can be kept as such or converted into salts by reaction with an aqueous solution of the chosen acid.

In the second case (where the solvent is dimethylaminoethanol), the excess dimethylaminoethanol is driven off under reduced pressure and the residue is taken up in water in the presence of a solvent and thereafter the procedure of the first case is followed.

The following examples illustrate the invention.

EXAMPLE 1

Preparation of dimethylaminoethanol
β-cyclohexylpropionate

1/10 mol of methyl β-cyclohexylpropionate, 1/10 mol of sodium methoxide, 1/10 mol of freshly distilled dimethylaminoethanol and 100 cm.³ of xylene are introduced into a flask equipped with a small column and a descending condenser. The flask is heated by means of an oil bath which is kept at about 130° C. Methyl alcohol rapidly distils off. After 3 hours' heating the distilled volume no longer increases.

The reaction mixture is allowed to cool, 100 cm.³ of water are added, and the mixture is then repeatedly washed by decantation until neutral to phenolphthalein. The product is dried over anhydrous calcium sulphate and distilled under normal pressure. Once the xylene has been driven off, the system is placed under reduced pressure and the product distilled.

Dimethylaminoethanol cyclohexylpropionate distils at 100° C. under 4 mm. Hg as a colourless liquid. On stirring it with a concentrated aqueous solution of maleic acid, the crystalline acid maleate of melting point 128–129° C. is obtained on cooling.

EXAMPLE 2

Preparation of dimethylaminoethanol
β-cyclopentylpropionate

1/10 mol of ethyl β-cyclopentylpropionate, 1/10 mol of sodium ethoxide, and 100 cm.³ of dimethylaminoethanol are introduced into an apparatus similar to the preceding apparatus. The mixture is heated for 3 hours at 125–130° C. and the excess dimethylaminoethanol is then removed in vacuo.

The residue, which has set solid, is dissolved in water. After again having added 100 cm.³ of solvent (for example benzene, toluene or hexane) the mixture is washed by decantation until neutral to phenol-phthalein. When this solution is dried and distilled as in Example 1, it yields the base distilling at about 96° C. under 4/5 mm. Hg.

With maleic acid, the acid maleate, of melting point 130° C. is again prepared.

I claim:
1. A process for the preparation of dimethylaminoethyl β-cycloalkylpropionate esters which comprises:
reacting a member selected from the group consisting of the methyl, ethyl, propyl and butyl cycloalkylpropionate esters with dimethylaminoethanol in a non-aqueous solvent in the presence of a member selected from the group consisting of sodium methoxide and sodium ethoxide at a temperature at which the alcohol reaction product is distilled from the reaction mixture.
2. Process according to claim 1 in which the non-aqueous solvent is a hydrocarbon.
3. Process according to claim 2 in which the hydrocarbon is selected from the groups consisting of toluene and xylene.
4. Process according to claim 1 in which the non-aqueous solvent is dimethylaminoethanol.
5. The process of claim 1 wherein said reaction is effected at a temperature from about 125° to about 130° C.
6. The process of claim 5 wherein said cycloalkylpropionate is β-cyclohexylpropionate.
7. The process of claim 5 wherein said cycloalkylpropionate is β-cyclopentylpropionate.

References Cited
UNITED STATES PATENTS

| | | | |
|---|---|---|---|
| 2,512,307 | 6/1950 | Clinton et al. | 260—469 |
| 2,583,450 | 1/1952 | Tilford et al. | 260—468 |
| 3,166,585 | 1/1965 | Valette | 260—468 |
| 3,527,792 | 9/1970 | Ebetino | 260—468 |

LORRAINE A. WEINBERGER, Primary Examiner

R. GERSTL, Assistant Examiner